(12) United States Patent
Wakayama

(10) Patent No.: US 11,990,038 B2
(45) Date of Patent: May 21, 2024

(54) CONTROL DEVICE, MOVING BODY, CONTROL METHOD, AND STORAGE MEDIUM

(71) Applicant: HONDA MOTOR CO., LTD., Tokyo (JP)

(72) Inventor: Ryoji Wakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 213 days.

(21) Appl. No.: 17/584,310

(22) Filed: Jan. 25, 2022

(65) Prior Publication Data

US 2022/0262244 A1 Aug. 18, 2022

(30) Foreign Application Priority Data

Feb. 18, 2021 (JP) ................. 2021-024374

(51) Int. Cl.
*G08G 1/07* (2006.01)
*G06V 20/58* (2022.01)
*G08G 1/056* (2006.01)

(52) U.S. Cl.
CPC ............. *G08G 1/07* (2013.01); *G06V 20/584* (2022.01); *G08G 1/056* (2013.01)

(58) Field of Classification Search
None
See application file for complete search history.

(56) References Cited

U.S. PATENT DOCUMENTS

| 10,807,610 | B1 * | 10/2020 | Katsuyama | G08G 1/091 |
| 2006/0009188 | A1 * | 1/2006 | Kubota | G08G 1/096725 455/344 |
| 2017/0124870 | A1 * | 5/2017 | Weber | G08G 1/096783 |

FOREIGN PATENT DOCUMENTS

JP 2009-061871 A 3/2009

* cited by examiner

*Primary Examiner* — John F Mortell
(74) *Attorney, Agent, or Firm* — Thomas| Horstemeyer, LLP

(57) ABSTRACT

A control device is mounted on a moving body, and the control device is configured to display, on a display unit, a display of a traffic signal included in an image that has been captured by an imaging unit for imaging an external field of the moving body. The control device comprises a recognition unit configured to recognize the display of the traffic signal from the image; a communication unit configured to receive display information of the traffic signal through wireless communication; and a control portion configured to determine the display of the traffic signal, based on the display of the traffic signal that has been recognized by the recognition unit and the display information that has been received by the communication unit, and configured to display, on the display unit, the display of the traffic signal that has been determined.

11 Claims, 11 Drawing Sheets

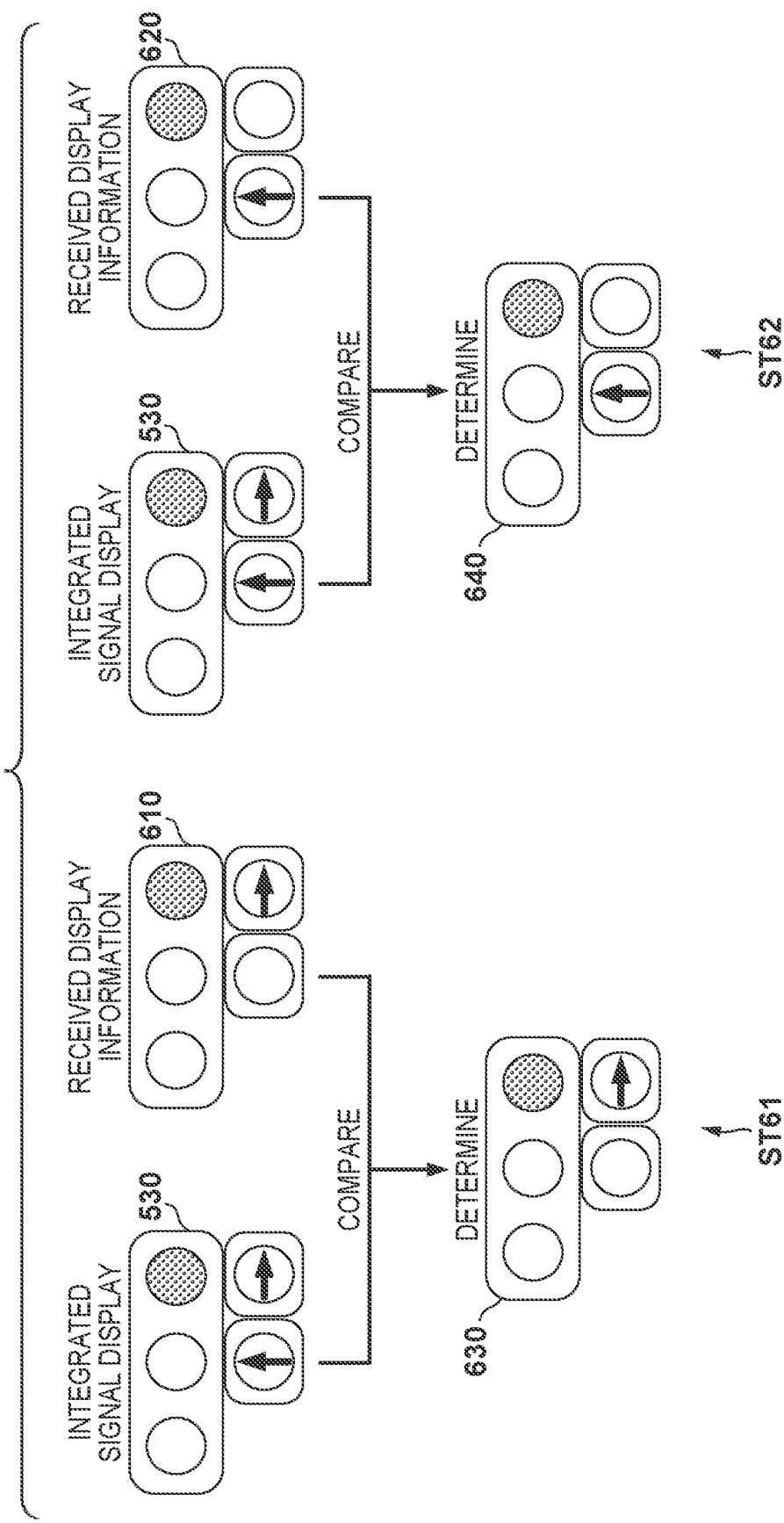

FIG. 7

| | RECOGNIZED DISPLAY COLOR (701) | RECEIVED DISPLAY INFORMATION (702) | DETERMINED DISPLAY COLOR (703) |
|---|---|---|---|
| 710 | GREEN | GREEN | GREEN + REMAINING DURATION |
| 720 | GREEN | RED | RED |
| 730 | GREEN | unknown | GREEN |
| 740 | RED | GREEN | RED |
| 750 | RED | RED | RED + REMAINING DURATION |
| 760 | RED | unknown | RED |
| 770 | unknown | RED | RED |

FIG. 8

| | RECOGNIZED ARROW SIGNAL (801) | RECEIVED DISPLAY INFORMATION (802) | DETERMINED ARROW SIGNAL (803) |
|---|---|---|---|
| 810 | INDICATION DIRECTION_TURNING TO THE RIGHT | INDICATION DIRECTION_TURNING TO THE RIGHT | INDICATION DIRECTION_TURNING TO THE RIGHT + REMAINING DURATION |
| 820 | INDICATION DIRECTION_TURNING TO THE RIGHT | INDICATION DIRECTION_ABSENT | ABSENT |
| 830 | INDICATION DIRECTION_ABSENT | INDICATION DIRECTION_TRAVELING STRAIGHT | ABSENT |
| 840 | INDICATION DIRECTION_ABSENT | INDICATION DIRECTION_ABSENT | INDICATION DIRECTION_ABSENT + REMAINING DURATION |

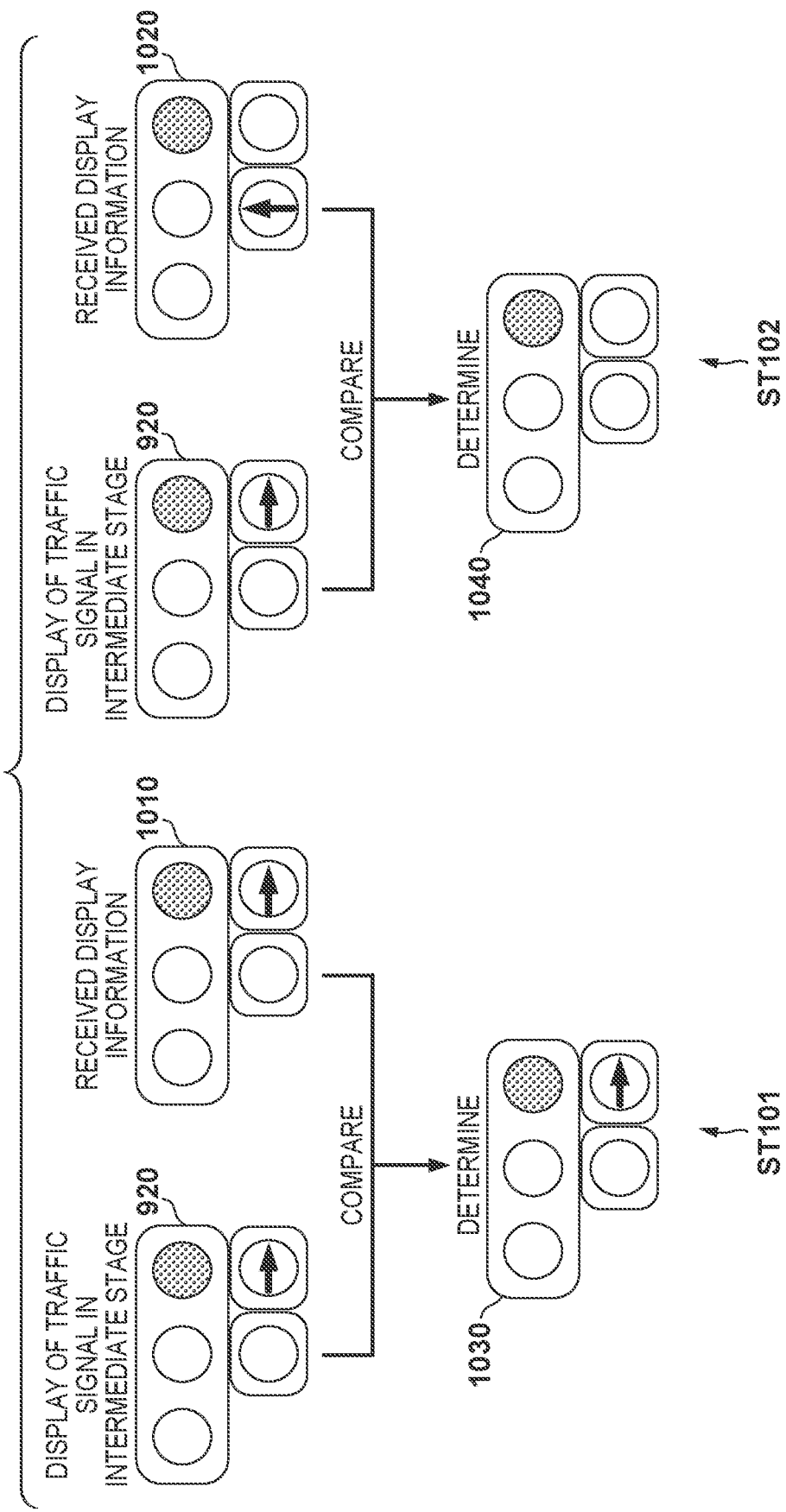

CONTROL DEVICE, MOVING BODY, CONTROL METHOD, AND STORAGE MEDIUM

CROSS-REFERENCE TO RELATED APPLICATION(S)

This application claims priority to and the benefit of Japanese Patent Application No. 2021-024374 filed on Feb. 18, 2021, the entire disclosure of which is incorporated herein by reference.

BACKGROUND OF THE INVENTION

Field of the Invention

The present invention relates to a control device, a moving body, a control method, and a storage medium.

Description of the Related Art

Japanese Patent Laid-Open No. 2009-61871 discloses a technique for switching a recognition result of either signal recognition that has been recognized by a camera or signal recognition that has been acquired through wireless communication in accordance with a vehicle speed, and displaying the recognition result on a display inside a vehicle.

There are some cases, however, where it is difficult to accurately recognize the display of a traffic signal in an image that has been captured by the camera (imaging unit) because of surrounding environments of a traveling road, such as a part of the traffic signal being covered due to an influence of a street tree on a roadside or a weather condition such as snowfalls. In addition, there can be cases where the recognition result cannot be acquired through wireless communication depending on the communication state.

In consideration of the above issues, the present invention provides a technique capable of determining a display of a traffic signal, based on a comparison between a recognition result of an imaging unit and display information that has been received by a communication unit through communication.

SUMMARY OF THE INVENTION

According to one aspect of the present invention, there is provided a control device to be mounted on a moving body, and configured to display, on a display unit, a display of a traffic signal included in an image that has been captured by an imaging unit for imaging an external field of the moving body, the control device comprising:
a recognition unit configured to recognize the display of the traffic signal from the image;
a communication unit configured to receive display information of the traffic signal through wireless communication; and
a control portion configured to determine the display of the traffic signal, based on the display of the traffic signal that has been recognized by the recognition unit and the display information that has been received by the communication unit, and configured to display, on the display unit, the display of the traffic signal that has been determined,
wherein the control portion comprises:
a lighting color determination unit configured to compare a lighting color of the traffic signal that has been recognized by the recognition unit with a lighting color of the traffic signal that has been acquired from the display information through the wireless communication, and configured to determine a lighting color of the traffic signal to be displayed on the display unit in accordance with a predetermined priority order based on a comparison result; and
a traveling direction determination unit configured to compare an instruction for a traveling direction of the traffic signal that has been recognized by the recognition unit with an instruction for a traveling direction of the traffic signal that has been acquired from the display information through the wireless communication, and configured to determine the instruction for the traveling direction that matches as a comparison result, as the instruction for the traveling direction to be displayed on the display unit.

According to the present invention, the display of the traffic signal can be determined, based on the comparison between the recognition result of the imaging unit and the display information that has been received by the communication unit through communication.

BRIEF DESCRIPTION OF THE DRAWINGS

FIG. 6 is a diagram schematically illustrating a comparison process between a recognition result of a display of a traffic signal and display information, and a determination process of the display of the traffic signal;

FIG. 7 is a diagram illustrating an example of setting a predetermined priority order related to a lighting color of the traffic signal;

FIG. 8 is a diagram illustrating a determination example of an instruction for a traveling direction of the traffic signal;

FIG. 10 is a diagram schematically illustrating a comparison process between the display of the traffic signal in an intermediate stage and the display information, and a determination process of the display of the traffic signal.

DESCRIPTION OF THE EMBODIMENTS

Figure 1:
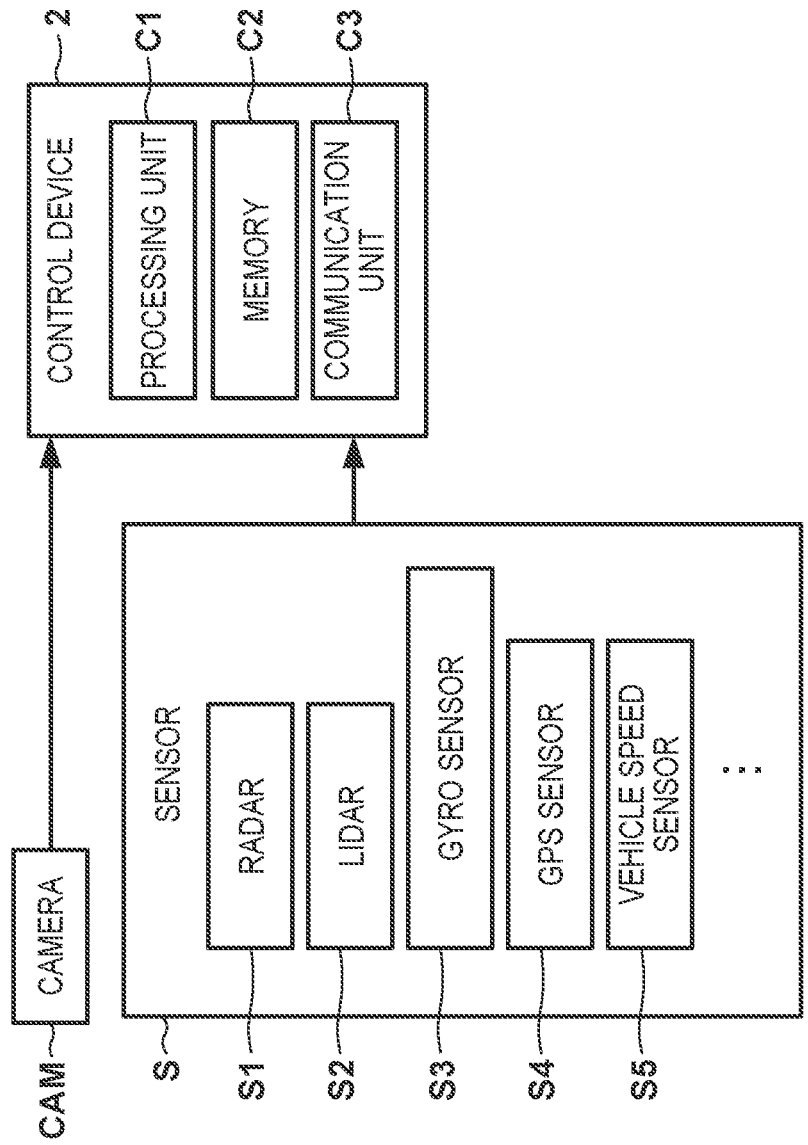
FIG. 1 is a block diagram illustrating a basic configuration of a control device.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

In a first embodiment, a moving body includes a vehicle. In the following description, the moving body will be described as an example of the vehicle, and a configuration for presenting (displaying) information to a vehicle occupant (driver) will be described. FIG. 1 is a block diagram illustrating a basic configuration of a control device 2 that controls a vehicle 1. The control device 2 includes a processing unit C1 that performs processes, a memory C2, a communication unit C3 capable of communicating with a server on a network or an external device, and the like. A sensor S includes, for example, a plurality of radars S1, a plurality of LIDARs S2 (light detection and ranging), a gyro sensor S3, a GPS sensor S4, a vehicle speed sensor S5, and the like. The sensor S and a camera CAM each function as an external sensor that acquires external information related to location information of target objects including physical objects or signs or vehicles present in the surroundings of the self-vehicle. The sensor S and the camera CAM (external sensor) acquire information of the vehicle and various types of information in the surroundings of the vehicle, and input the information that has been acquired to the control device 2.

The control device 2 performs image processing on information that has been input from the radar S1, the LIDAR S2, and the camera CAM, extracts a target object (object) present in the surroundings of the vehicle, analyzes what kind of target object is arranged in the surroundings of the vehicle, and monitors the target object. For example, it is possible to recognize the display of a traffic signal located ahead the road on which the vehicle is traveling.

The control device 2 functions as a vehicle control device that conducts automated driving control of the vehicle based on information of the target object (object) that has been extracted and information that has been input from the sensor S and the camera CAM, and also functions as a display control device that displays, on a display unit, information of the target object (object) such as a display of a traffic signal. The display control device is mounted on the moving body (vehicle), and displays, on the display unit, the display of the traffic signal included in an image that has been captured by the camera CAM (imaging unit) that images an external field of the moving body (vehicle). In addition, the control device 2 functions as a device including a navigation function that maps a current location of the self-vehicle on a map and that provides route guidance to a destination. These devices and equipment are configured to be connected for enabling data communication with each other through a communication medium such as a controller area network (CAN).

In addition, the gyro sensor S3 is capable of detecting a rotational motion and a posture of the vehicle, and the control device 2 is capable of determining the course of the vehicle based on a detection result of the gyro sensor S3, a vehicle speed that has been detected by the vehicle speed sensor S5, and the like. In addition, the control device 2 is capable of acquiring the current location (location information) of the vehicle in map information and road information such as the number of lanes, a road shape on which the vehicle (self-vehicle) is traveling, a lane decrease or a lane increase in the route, the presence of a construction work, a breakdown vehicle, and the like, based on the detection result of the GPS sensor S4. The control device 2 is capable of controlling the automated driving traveling of the vehicle, by causing a plurality of control states to transition in a stepwise manner, based on information of the surrounding environment of the vehicle. That is, the control device 2 acquires information of the surrounding environment of the vehicle using the information of the sensor S and the camera CAM, and changes the control state of the vehicle based on the information of the surrounding environment, so as to control the automated driving traveling of the vehicle.

In a case where the process of the control device 2 illustrated in FIG. 1 is performed on the vehicle, the control device 2 may be arranged, for example, in an ECU of a recognition processing system or an image processing system that processes the information of the sensor S or the camera CAM, may be arranged in an ECU that controls a communication device, a display device, or an input and output device, or may be arranged in an ECU that conducts driving control of the vehicle or an ECU for automated driving.

Figure 2:
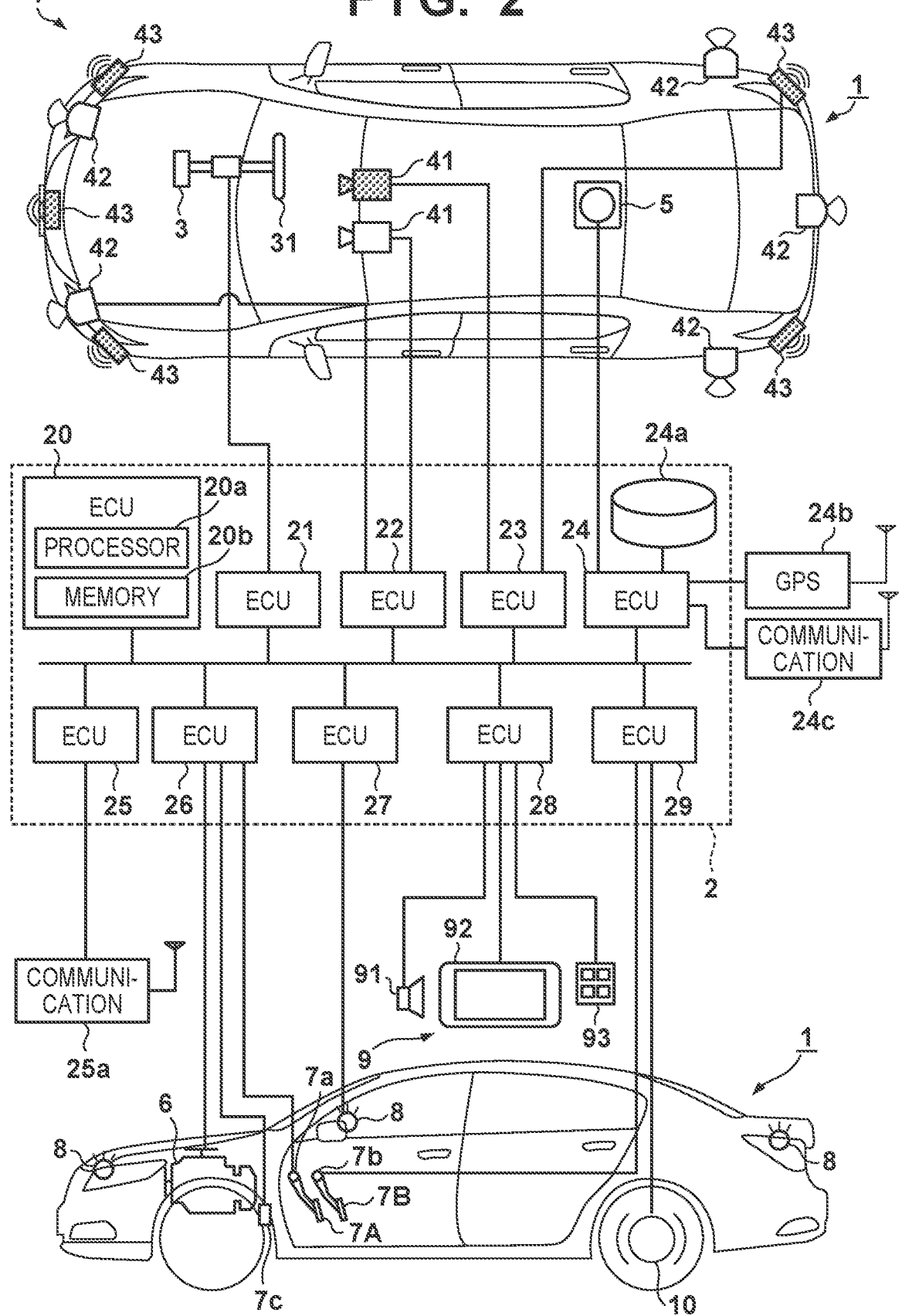
FIG. 2 is a block diagram illustrating a configuration example in which a functional configuration of the control device is provided in a vehicle.

For example, as illustrated in FIG. 2 to be described below, the functions of the control device 2 may be distributed to a plurality of ECUs provided for controlling the vehicle 1, such as ECUs 22 and 23 for the radar, the LIDAR, and the camera, ECUs 24 and 25 for communication control, an ECU 28 for the input and output device, and an ECU 20 for automated driving.

FIG. 2 is a block diagram illustrating a configuration example in which a control device 2 (FIG. 1) functioning as a control device is provided in the vehicle 1. In FIG. 2, the vehicle 1 is schematically illustrated in a plan view and a side view. The vehicle 1 is, for example, a four-wheeled passenger vehicle of a sedan type.

The control device 2 of FIG. 2 controls each unit of the vehicle 1. The control device 2 includes a plurality of ECUs 20 to 29 communicably connected by an in-vehicle network. Each electronic control unit (ECU) includes a processor represented by a CPU, a storage device such as a semiconductor memory, an interface with an external device, and the like. In the storage device, programs executed by the processor, data used for processes performed by the processor, and the like are stored. Each ECU may include a plurality of processors, storage devices, interfaces, and the like. For example, the ECU 20 includes a processor 20a and a memory 20b. The processor 20a executes a command included in the program stored in the memory 20b, so a process is executed by the ECU 20. Alternatively, the ECU 20 may include a dedicated integrated circuit such as an application-specific integrated circuit (ASIC) for the ECU 20 to execute the process. A similar configuration applies to other ECUs.

Hereinafter, functions and the like assigned to the ECUs 20 to 29 will be described. Note that the number of ECUs and the functions assigned to the ECUs can be designed as appropriate in accordance with the vehicle 1, and can be subdivided or integrated, when compared with the present embodiment.

The ECU 20 conducts vehicle control related to the automated driving of the vehicle 1 (self-vehicle) according to the present embodiment. In the automated driving, steering of the vehicle 1, a lane change, and acceleration or deceleration are controlled in an automated manner. Processes related to specific control for the automated driving will be described later in detail.

The ECU 21 controls an electric power steering device 3. The electric power steering device 3 includes a mechanism for steering front wheels in accordance with a driver's driving operation (steering operation) on a steering wheel 31. In addition, the electric power steering device 3 assists a steering operation, or includes a motor for exerting driving force to conduct automated steering of the front wheels, a sensor for detecting a steering angle, and the like. In a case where the driving state of the vehicle 1 is automated driving, the ECU 21 controls the electric power steering device 3 in an automated manner in response to an instruction from the ECU 20, and controls the traveling direction of the vehicle 1.

The ECUs 22 and 23 control detection units 41 to 43 that detect surrounding situations of the vehicle, and performs information processing of the detection results. The detection unit 41 has a configuration corresponding to the camera CAM in FIG. 1, and is an imaging device (hereinafter, referred to as the camera 41, in some cases) that detects an object ahead the vehicle 1 by imaging. In the present embodiment, the camera 41 is attached to the vehicle interior side of the windshield in a roof front part of the vehicle 1 so as to be capable of capturing images ahead the vehicle 1. By analyzing the images that have been captured by the camera 41 (image processing), it is possible to extract an outline of a target object such as a traffic signal located ahead the vehicle 1, the display of a traffic signal, and a lane marking (white line or the like) of a lane on a road.

The detection unit (LIDAR detection unit) 42 is a light detection and ranging (LIDAR) (hereinafter, referred to as the LIDAR 42, in some cases), detects a target object in the surrounding of the vehicle 1, and measures a distance to the target object. The detection unit 42 (LIDAR 42) has a configuration corresponding to the LIDAR S2 in FIG. 1. In the present embodiment, five LIDARs 42 are provided, including one at each corner portion of a front part of the vehicle 1, one at the center of a rear part of the vehicle 1, and one at each lateral side of the rear part of the vehicle 1.

The detection unit (radar detection unit) 43 is a millimeter-wave radar (hereinafter, referred to as the radar 43, in some cases), detects a target object in the surrounding of the vehicle 1, and measures a distance to the target object. The detection unit 43 (radar 43) has a configuration corresponding to the radar S1 in FIG. 1. In the present embodiment, five radars 43 are provided, including one at the center of the front part of the vehicle 1, one at each corner portion of the front part of the vehicle 1, and one at each corner portion of the rear part of the vehicle 1.

The ECU 22 controls one camera 41 and each LIDAR 42, and performs information processing on a detection result. The ECU 23 controls the other camera 41 and each radar 43, and performs information processing on a detection result. Two sets of devices for detecting the surrounding situations of the vehicle are provided, so that the reliability of the detection results can be improved. In addition, different types of detection units such as the cameras, the LIDARs, and the radars are provided, so that the surrounding environments of the vehicle can be analyzed in multiple ways. In the present embodiment, the ECU 22 and the ECU 23 each function as a recognition unit, and each recognize the display of the traffic signal from the image that has been captured by the camera 41 (imaging unit). Here, the display of the traffic signal includes lighting colors (red, green, and yellow) of the traffic signal and instructions for a traveling direction indicated by an arrow display of the traffic signal.

The ECU 24 controls a gyro sensor 5, a global positioning system (GPS) sensor 24b, and a communication device 24c, and performs information processing on a detection result or a communication result. The gyro sensor 5 detects a rotational motion of the vehicle 1. The detection result of the gyro sensor 5, the wheel speed, and the like enable determination of the course of the vehicle 1. The GPS sensor 24b detects the current location of the vehicle 1. The communication device 24c wirelessly communicates with a server that provides map information and traffic information, and acquires these pieces of information. The communication device 24c wirelessly communicates with an information providing server of a system for monitoring traffic situations of roads, for example, vehicle information and communication system (VICS) (registered trademark), and acquires traffic information indicating traffic situations of the road on which a self-vehicle 1 is traveling or roads on which the self-vehicle 1 is going to travel. The traffic information includes traffic congestion information on a route that has been set, a period of time required to pass through a traffic congestion location, and traffic obstruction information of a breakdown vehicle, a construction work information, speed regulation and lane regulation information, and the like. In addition, the communication device 24c acquires map information that holds display information of a traffic signal (lighting color and traveling direction of the traffic signal) through wireless communication. The communication device 24c acquires, through wireless communication, map information that holds display information of a traveling direction of a traffic signal indicating at least a direction of an arrow signal, as the display information of the traffic signal, and stores the map information in a storage device.

The ECU 24 is capable of accessing a map information database 24a constructed in the storage device, and the ECU 24 searches for a route or the like from the current location to a destination. The database 24a can be arranged on a network, so that the communication device 24c can access the database 24a on the network to acquire information. The gyro sensor 5 and the GPS sensor 24b respectively have configurations corresponding to the gyro sensor S3 and the GPS sensor S4 in FIG. 1.

The ECU 25 includes a communication device 25a capable of conducting vehicle-to-vehicle communication or road-to-vehicle communication or communicating with an information processing device such as a smartphone. For example, the communication device 25a is capable of wirelessly communicating with another vehicle in the surroundings, exchanging information between the vehicles, or exchanging information with an external information processing device or the like through wireless communication. The communication device 25a and the communication device 24c are each a configuration corresponding to the communication unit C3 in FIG. 1. In the present embodiment, the communication device 25a and the communication device 24c each function as a communication unit to receive the display information of the traffic signal through wireless communication.

The ECU 26 controls a power plant 6. The power plant 6 is a mechanism that outputs driving force for rotating driving wheels of the vehicle 1, and includes, for example, an engine and a transmission. Note that the configuration of the power plant 6 is not limited to this example, and is for an electric vehicle using an electric motor as a power source, a hybrid vehicle including an engine and an electric motor, and the like. Among them, the electric vehicle is driven using, for example, electric power discharged by a battery such as a secondary battery, a hydrogen fuel cell, a metal fuel cell, an alcohol fuel cell, or the like.

For example, the ECU 26 controls an output from the engine in accordance with a driver's driving operation (accelerator operation or acceleration operation) that has been detected by an operation detection sensor 7a provided on an accelerator pedal 7A, and switches the gear ratio of the transmission based on information such as the vehicle speed that has been detected by a vehicle speed sensor 7c (vehicle speed sensor S5 in FIG. 1). In a case where the driving state of the vehicle 1 is automated driving, the ECU 26 controls the power plant 6 in an automated manner in response to an instruction from the ECU 20, and controls the acceleration and deceleration of the vehicle 1.

The ECU 27 controls lighting devices (headlights, taillights, and the like) including direction indicators 8 (blinkers). In the example of FIG. 1, the direction indicator 8 is provided in the front part, the door mirror, and the rear part of the vehicle 1.

The ECU 28 controls an input and output device 9. The input and output device 9 outputs information to occupants including the driver, and receives an input of information from the occupant. A sound output device 91 notifies the occupants of information by sounds. A display device 92 notifies the driver of information by displaying an image. The display device 92 is, for example, arranged in front of the driver's seat and the passenger's seat, and constitutes an instrument panel of a touch panel type or the like functioning as a human-machine interface. In the present embodiment, the ECU 28 functions as a control portion, determines a display of a traffic signal, based on the display of the traffic signal that has been recognized by the recognition unit (ECU 22, 23) and the display information that has been received by the communication unit (communication device 24c, 25a), and displays the display of the traffic signal that has been determined on the display device 92 (display unit).

On the route from the current location to the destination that has been searched for by the ECU 24, the ECU 28 conducts display control for displaying, on the display device 92, road information, which has been acquired from the location information of the vehicle 1 (self-vehicle) and the map information, and which includes a plurality of lanes including the lane in which the vehicle 1 is currently traveling. Further, the ECU 28 causes the sound output device 91 and the display device 92 to provide the driver with sounds, map display, and guidance information by sounds.

Note that, although the sound and the display have been given as examples here, information may be notified by vibration or light. In addition, notification of information may be provided by using a combination of some of the sound, the display, the vibration, and the light. Furthermore, the combination or the notification mode may be changed in accordance with the level (for example, the degree of urgency) of information notification of which should be provided.

An input device 93 is arranged at a position operable by the driver, and includes a switch group for inputting an instruction to the vehicle 1 and a voice input device for inputting occupant's voices.

The ECU 29 controls a brake device 10 and a parking brake (not illustrated). The brake device 10 is, for example, a disc brake device, is provided on each wheel of the vehicle 1, and applies resistance to the rotation of the wheel to decelerate or stop the vehicle 1. The ECU 29 controls working of the brake device 10 in response to the driver's driving operation (brake operation) that has been detected by an operation detection sensor 7b provided on a brake pedal 7B, for example. In a case where the driving state of the vehicle 1 is automated driving, the ECU 29 controls the brake device 10 in an automated manner in response to an instruction from the ECU 20, and controls the deceleration and stop of the vehicle 1. The brake device 10 and the parking brake are also capable of working to maintain a stopped state of the vehicle 1. In addition, in a case where the transmission of the power plant 6 is provided with a parking lock mechanism, the parking lock mechanism is also capable of working to maintain the stopped state of the vehicle 1.

(Outline of Process)

Figure 4:
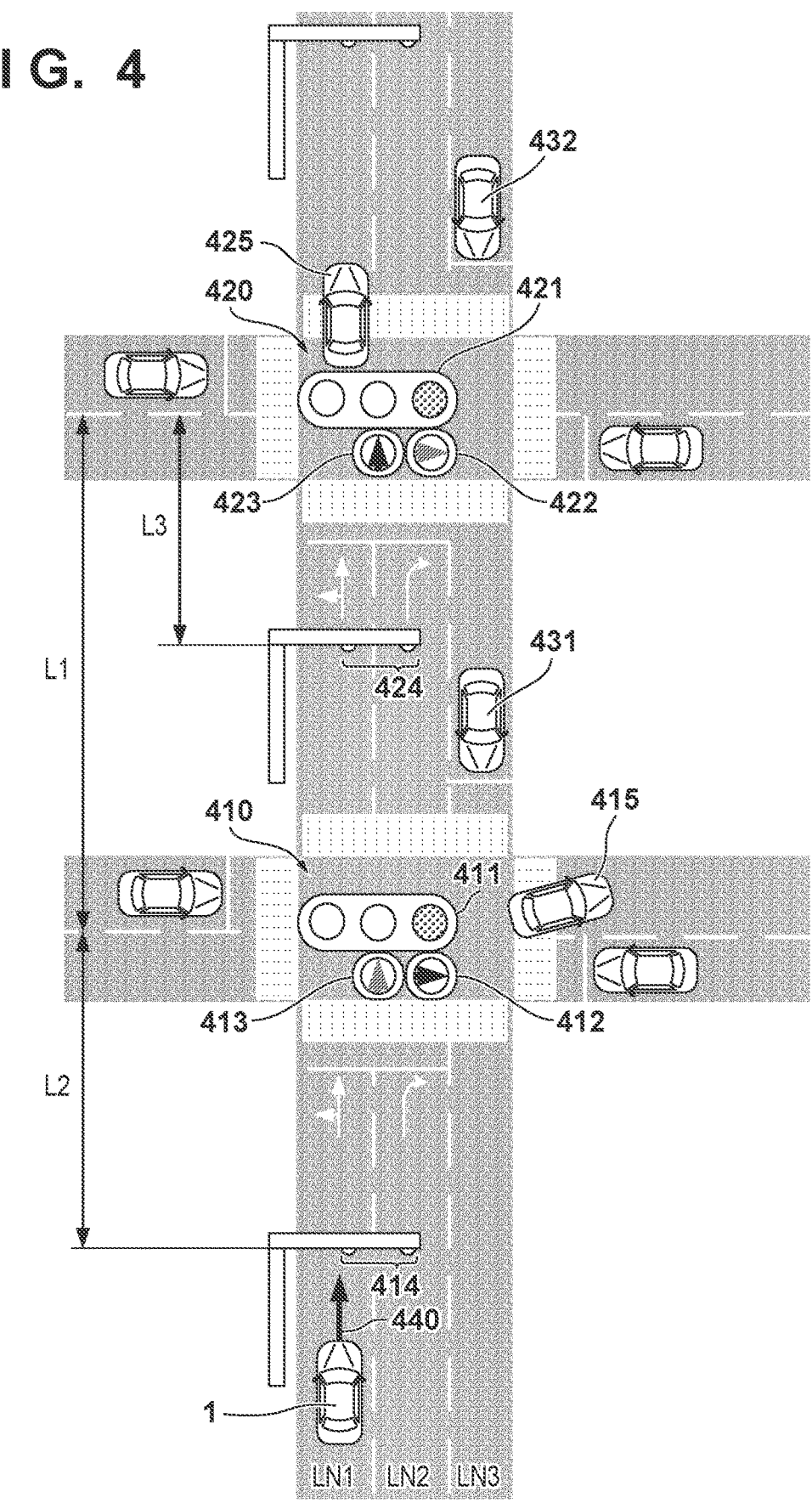
FIG. 4 is a diagram schematically illustrating roads on which a vehicle travels.

Next, an outline of a process performed by the control device 2 will be described. FIG. 4 is a diagram schematically illustrating roads on which the vehicle 1 travels. As illustrated in FIG. 4, the vehicle 1 is traveling on a lane LN1 where the vehicle 1 is capable of traveling straight or turning to the left in the direction of an arrow 440. A lane LN2 adjacent to the lane LN1 is an exclusive lane for turning to the right, and a lane LN3 is an opposite lane. Other vehicles 431 and 432 are capable of traveling in a direction opposite to the arrow 440.

A first intersection 410 and a second intersection 420 are located ahead the vehicle 1. The first intersection 410 is an intersection located to be closest to the traveling location of the vehicle 1, and the second intersection 420 is an intersection located apart from the first intersection 410 by a distance L1.

A first traffic signal 411 is provided at the first intersection 410, and the first traffic signal 411 including lighting display units of "red", "yellow", and "green" is provided with arrow signal units 412 and 413 each indicating an instruction for a traveling direction with an arrow signal. In the display example illustrated in FIG. 4, the lighting color of the first traffic signal 411 is "red" (displayed by shading), and the arrow signal of the arrow signal unit 412 indicating the instruction for turning to the right is in a lighting state. In addition, the arrow signal of the arrow signal unit 413 indicating an instruction for traveling straight is in a turn-off state (non-lighting state). Another vehicle 415 has just turned to the right at the first intersection 410 from the lane LN2 in accordance with the lighting display of the arrow signal unit 412 indicating an instruction for turning to the right.

A second traffic signal 421 is provided at a second intersection 420, and the second traffic signal 421 including lighting display units of "red", "yellow", and "green" is provided with arrow signal units 422 and 423 each indicating an instruction for a traveling direction with an arrow signal. In the display example illustrated in FIG. 4, the lighting color of the second traffic signal 421 is "red" (displayed by shading), and the arrow signal of the arrow signal unit 422 indicating the instruction for turning to the right is in the turn-off state (non-lighting state). In addition, the arrow signal of the arrow signal unit 423 indicating the instruction for traveling straight is in the lighting state. Another vehicle 425 has just traveled straight through the second intersection 420 from the lane LN1 in accordance with the lighting display of the arrow signal unit 423 indicating the instruction for traveling straight.

Note that in the present embodiment, the case of "red" is described as an example for the lighting color of each traffic signal. However, in the processing of the control device 2 in the present embodiment, the lighting color is not limited to "red", and a similar description applies to the lighting colors of "yellow" and "green". In addition, the display examples for turning to the right and traveling straight are each illustrated as a display example of the arrow signal. However, the control device 2 is capable of performing a similar process, even when the arrow signal for turning to the left is displayed.

An external communication device 414 is arranged at a closer location than the location of the first intersection 410, and has a distance L2 to the first intersection 410. An external communication device 424 is arranged at a closer location than the location of the second intersection 420, and has a distance L3 to the second intersection 420. The external communication devices 414 and 424 are each configured as, for example, a beacon type of external communication device or a cellular type of external communication device using a mobile communication network standardized by communication standards for mobile telephones. The external communication devices 414 and 424 each have a communication function in accordance with vehicle to everything (V2X). The external communication devices 414 and 424 each communicate with a signal control system that controls displays of the traffic signals (the first traffic signal 411 and the second traffic signal 421), and each distribute display information of the traffic signal that has been received from the signal control system to moving bodies. The external communication devices 414 and 424 are arranged above the lanes (LN1 and LN2). When a moving body travels below the external communication devices 414 and 424, the communication unit (communication device 24c, 25a) of the moving body is capable of receiving display information of the traffic signals that has been transmitted from the external communication devices 414 and 424.

The communication unit (communication device 24c, 25a) of the moving body collectively receives the display information of the traffic signals, when traveling below the external communication devices 414 and 424. For example, the display information of the traffic signal includes at least the following information.

First traffic signal 411: current lighting color "red"
Display state of arrow signal (turning to the right is lighting, traveling straight is non-lighting)
Next lighting signal "green", scheduled change time (after T1 seconds)
Second traffic signal 421: current lighting color "red"
Display state of arrow signal (turning to the right is non-lighting, traveling straight is lighting)
Next lighting signal "green", scheduled change time (after T2 seconds).

The signal control system that controls the display of the traffic signal changes the control timing of the display of the traffic signal (lighting color and instruction for traveling direction) in some cases, in accordance with a congestion situation at the intersection in order to smooth the traffic. Even when the display information of the traffic signal is changed, the cellular type of external communication device is capable of communicating the display information of the changed traffic signal in real time.

On the other hand, in the case of the beacon type of external communication device, for example, the display information that has been received by the communication unit (communication device 24c, 25a) of the moving body from the external communication device 414 is not updated, until the display information of the changed traffic signal is received from the next external communication device 424. In the present embodiment, a predetermined period of time (a reference period) elapsed from the time when traveling below the external communication device is considered to be a period of time while the display information of the traffic signal that has been received from the beacon type or cellular type of the external communication device 414 or 424 can be maintained as accurate information.

(Process Flow)

Figure 3A:
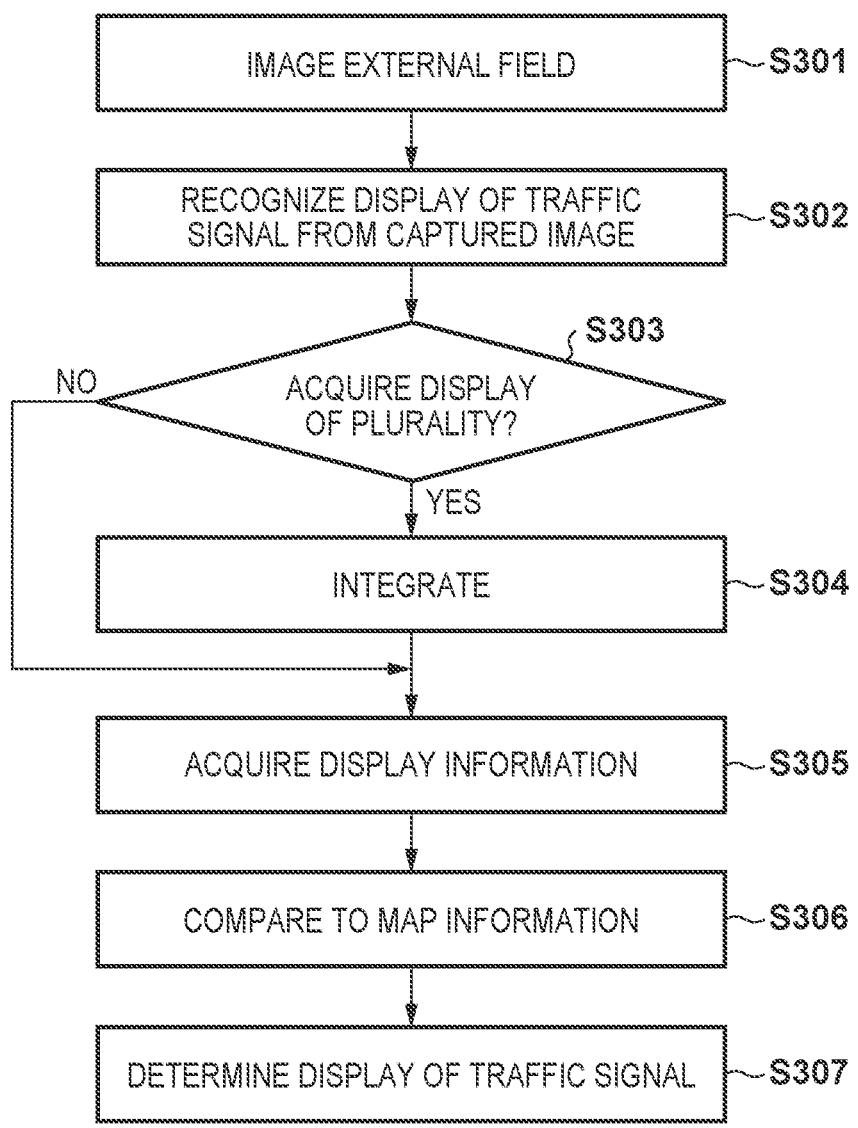
FIG. 3A is a diagram for describing a flow of a process performed by the control device according to a first embodiment.
Figure 5:
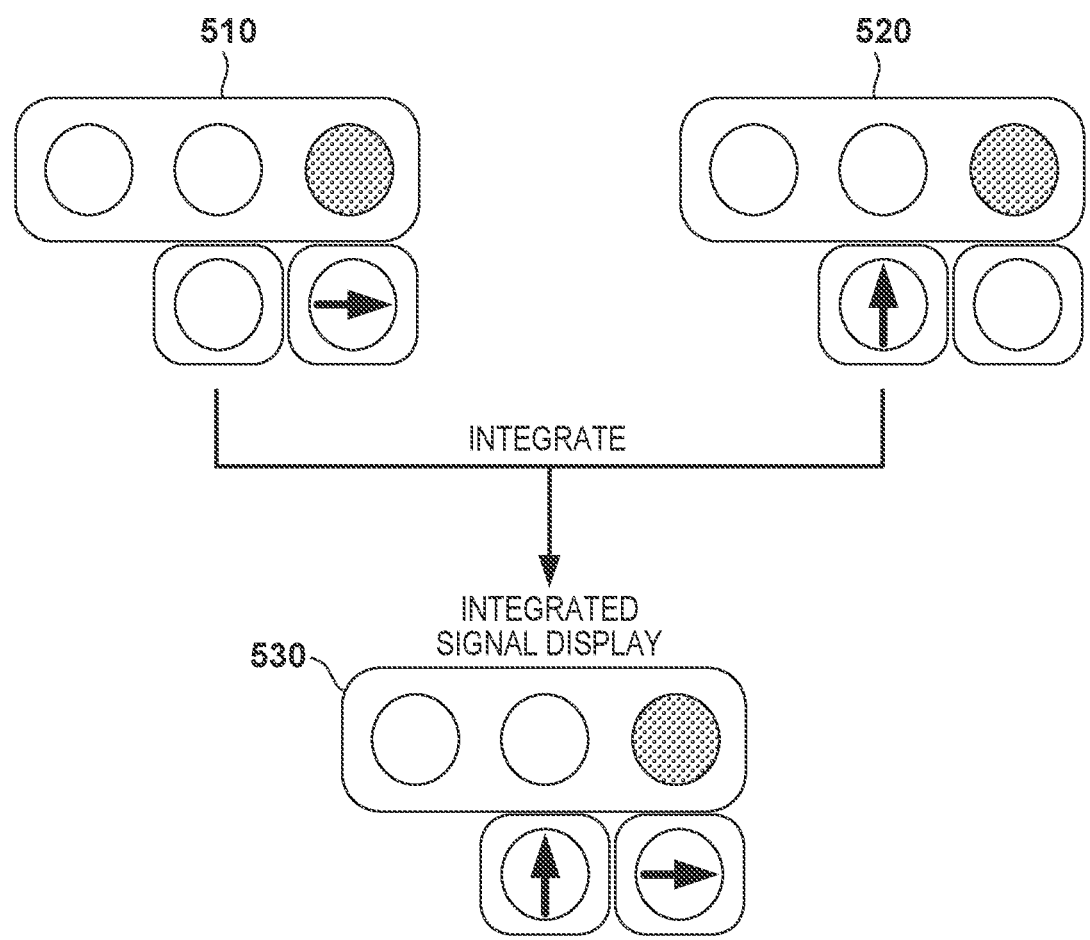
FIG. 5 is a diagram schematically illustrating an integration process of displays of a plurality of traffic signals.

Next, a process flow performed by the control device 2 will be described. FIG. 3A is a diagram for describing a flow of a process of the control device 2, and FIGS. 5 to 6 are diagrams each schematically illustrating an internal process for determining, by the ECU 28, a display of a traffic signal.

In S301 of FIG. 3A, the camera 41 (CAM) images an external field of the moving body (vehicle). In S302, the recognition unit (ECU 22, 23) recognizes the display of the traffic signal included in the image (captured image) that has been captured by the camera 41 (CAM). The recognition unit (ECU 22, 23) performs image processing on the captured image, and is capable of extracting the traffic signal included in the captured image and recognizing the display of the traffic signal.

In S303, the recognition unit (ECU 22, 23) determines whether a plurality of displays have been acquired as the display of the traffic signal. In a case where the plurality of displays have not been acquired (S303—No), the recognition unit (ECU 22, 23) advances the process to S305. On the other hand, in a case where the plurality of displays have been acquired in the determination process of S303 (S303—Yes), the recognition unit (ECU 22, 23) advances the process to S304.

In S304, the recognition unit (ECU 22, 23) integrates the displays of the plurality of traffic signals. The displays of the plurality of traffic signals can occur, for example, when the display of the first traffic signal 411 and the display of the second traffic signal 421 are captured by the camera 41, in a road structure in which the first intersection 410 and the second intersection 420 are continuously provided as illustrated in FIG. 4. FIG. 5 is a diagram schematically illustrating an integration process of the displays of the plurality of traffic signals. A display 510 of the first traffic signal is recognized based on the display (FIG. 4) of the first traffic signal 411, and a display 520 of the second traffic signal is recognized based on the display (FIG. 4) of the second traffic signal 421.

The integration process of the displays of the traffic signals is an addition of the display units. The recognition unit (ECU 22, 23) acquires an integrated signal display 530 obtained by adding the display of the arrow signal for turning to the right on the display 510 of the first traffic signal and the display of the arrow signal for traveling straight on the display 520 of the second traffic signal. The lighting color is "red", which is common between the display 510 of the first traffic signal and the display 520 of the second traffic signal, and the recognition unit (ECU 22, 23) acquires the integrated signal display 530 of the lighting color "red".

In the example illustrated in FIG. 5, the case where the lighting colors are the same with each other is illustrated, without being limited to this display example. In a case where the lighting colors are different from each other, for example, in a case where the lighting color in the display 510 of the first traffic signal is "green" and the lighting color in the display 520 of the second traffic signal is "red", the recognition unit (ECU 22, 23) is capable of acquiring the integrated signal display 530 of the lighting color ("red", "green") in which these lighting colors are added.

Returning of the description to FIG. 3A, in S305, the communication unit (communication device 24c, 25a) receives the display information of the traffic signal from the external communication devices 414 and 424 through wireless communication.

In S306, the ECU 28 (control portion) compares the recognition results (S302 and S304) of the displays of the traffic signals with the display information (S305).

Then, in S307, the ECU 28 (control portion) determines the display of the traffic signal based on a comparison result in S306. The ECU 28 (control portion) specifies the traveling location of the moving body, based on the location information of the moving body that has been acquired by the location information acquisition unit (ECU 24, gyro sensor 5, GPS sensor 24b). The ECU 28 (control portion) determines a display of a traffic signal related to an intersection located to be closest to the traveling location, from among the instructions for traveling directions of the traffic signals that have been recognized by the recognition unit (ECU 22, 23).

FIG. 6 is a view schematically illustrating a comparison process (S306) of comparing the recognition result of the display of the traffic signal with display information 610 and 620 that have been received through communication, and a determination process (S307) of determining the display of the traffic signal. ST61 in FIG. 6 is a diagram schematically illustrating a comparison process based on the display information 610 and a determination process of determining the display of the traffic signal. Here, the display information 610 indicates a display state in which the lighting color is red and the instruction for the traveling direction is turning to the right.

In addition, ST62 in FIG. 6 is a diagram schematically illustrating a comparison process based on the display information 620 and a determination process of determining the display of the traffic signal, and the display information 620 indicates a display state in which the lighting color is red and the instruction for the traveling direction is traveling straight.

In the present embodiment, the ECU 28 (control portion) can function as a lighting color determination unit and a traveling direction determination unit, as functional configurations. Here, the lighting color determination unit compares the lighting color of the traffic signal that has been recognized by the recognition unit (ECU 22, 23) with the lighting color of the traffic signal that has been acquired from the display information through wireless communication of the communication device 24c, and determines the lighting color of the traffic signal to be displayed on the display unit in accordance with a predetermined priority order based on the comparison result.

Further, the traveling direction determination unit compares the instruction for the traveling direction of the traffic signal that has been recognized by the recognition unit (ECU 22, 23) with the instruction for the traveling direction of the traffic signal that has been acquired from the display information through wireless communication of the communication device 24c, and determines the instruction for the traveling direction that matches as a comparison result, as the instruction for the traveling direction to be displayed on the display unit.

(Determination of Lighting Color)

FIG. 7 is a view illustrating a setting example of a predetermined priority order related to a lighting color of a traffic signal. The lighting color determination unit determines the lighting color of the traffic signal to be displayed on the display unit in accordance with the predetermined priority order (FIG. 7) based on a comparison result. The predetermined priority order illustrated in FIG. 7 is an example, and examples of "green" and "red" are described as the lighting colors. However, the exclusion of "yellow" is not intended, and a predetermined priority order including three colors can be set.

In the setting example of the priority order illustrated in FIG. 7, in a case where a display color 701 that has been recognized by the recognition unit (ECU 22, 23) and display information 702 that has been received by the communication unit (communication device 24c) are the same with each other (710, 750), the lighting color determination unit determines the lighting colors that are the same with each other, as the lighting color of the traffic signal to be displayed on the display unit. In this case, together with the lighting color, the lighting color determination unit determines a remaining period of time until the current lighting color is scheduled to change, based on the display information that has been received.

In the priority order setting example, in a case where the display color 701 that has been recognized by the recognition unit (ECU 22, 23) is not the same with the display information 702 that has been received by the communication unit (720 and 740), the lighting color determination unit determines the lighting color "red" as the lighting color of the traffic signal to be displayed on the display unit in order to prevent entrance to an intersection at a red signal.

In a case where the state of the camera 41 and the state of the control device 2 are not consistent with each other (730, 760, 770), such as a case where information for a comparison cannot be acquired, "unknown" indicating undetermined information is set in the display color 701 and display information 702 that have been recognized. In a case where undetermined information ("unknown") is set in at least one of the display color 701 and the display information 702 that have been recognized, the lighting color determination unit determines a lighting color of a traffic signal to be displayed on the display unit, based on the information that has been successfully acquired, in accordance with the predetermined priority order. For example, in a case where the display information 702 cannot be received from the communication unit and the undetermined information ("unknown") is set in the display information 702 (730, 760), the lighting color determination unit determines the lighting color of the traffic signal to be displayed on the display unit, based on the display color that has been recognized by the recognition unit (ECU 22, 23).

Regarding the lighting color of the traffic signal, in the example (ST61, ST62) of the determination process of FIG. 6, the lighting color (red) of the integrated signal display 530 and the display information 610 are the same with each other. The lighting color determination unit determines the lighting color (red) that is the same with the lighting color of the traffic signal to be displayed on the display unit, in accordance with the predetermined priority order based on the comparison result (750 in FIG. 7).

(Determination of Traveling Direction)

The traveling direction determination unit excludes the instruction for the traveling direction that is not the same with the instruction for the traveling direction of the traffic signal that has been acquired from the display information through wireless communication, from among the instructions for the traveling directions of the traffic signals that have been recognized by the recognition unit (ECU 22, 23). That is, the traveling direction determination unit determines, as the instruction for the traveling direction to be displayed on the display unit, the instruction for the traveling direction of the traffic signal that is the same with the instruction for the traveling direction of the traffic signal that has been acquired from the display information through wireless communication, from among the instructions for the traveling directions of the traffic signals that have been recognized by the recognition unit (ECU 22, 23).

In a case of acquiring displays of a plurality of traffic signals included in the image that has been captured by the camera 41, the recognition unit (ECU 22, 23) recognizes an integrated signal display 530 in which the displays of the plurality of traffic signals are integrated, as the display of the traffic signal (FIG. 5). The traveling direction determination unit determines the instruction for the traveling direction that matches as a comparison result between the integrated signal display 530 and the display information (610, 620) through wireless communication, as the instruction for the traveling direction to be displayed on the display unit.

FIG. 8 is a diagram illustrating an example of determining the instruction for the traveling direction of the traffic signal. The traveling direction determination unit compares an arrow signal 801 (instruction for the traveling direction of the traffic signal) that has been recognized by the recognition unit (ECU 22, 23) with the instruction for the traveling direction of the traffic signal that has been acquired from display information 802 through wireless communication of the communication device 24c, and determines the instruction for the traveling direction that matches as a comparison result, as the instruction for the traveling direction to be displayed on the display unit.

As illustrated in FIG. 8, in a case where the arrow signal 801 that has been recognized by the recognition unit (ECU 22, 23) is the same with the display information 802 that has been received by the communication unit (communication device 24c) (810, 840), the traveling direction determination unit determines the instruction for the traveling direction that matches as a comparison result, as the instruction for the traveling direction to be displayed on the display unit (803). In this case, together with the instruction for the traveling direction (the direction of the arrow signal), the traveling direction determination unit determines the remaining period of time until the current arrow signal is scheduled to change, based on the display information 802 that has been received. In addition, in a case where the comparison result is not the same (820, 830), the traveling direction determination unit determines that there is no instruction for the traveling direction (803).

Regarding the arrow signal, in the example of the determination process (ST61) of FIG. 6, by comparing the arrow signal that has been recognized (traveling straight, turning to the right) with the display information that has been received (turning to the right) by the communication unit (communication device 24c, 25a), the traveling direction determination unit determines the instruction for the traveling direction (turning to the right) that matches as a comparison result, as the instruction for the traveling direction to be displayed on the display unit.

In addition, in the example of the determination process (ST62) of FIG. 6, by comparing the arrow signal that has been recognized (traveling straight, turning to the right) with the display information that has been received (traveling straight) by the communication unit (communication device 24c, 25a), the traveling direction determination unit determines the instruction for the traveling direction (traveling straight) that matches as a comparison result, as the instruction for the traveling direction to be displayed on the display unit.

In a case where the communication unit (communication device 24c, 25a) receives the display information of the traffic signal through wireless communication with the external communication devices 414 and 424 arranged above the lane in which the moving body travels, minimum lighting periods and maximum lighting periods are transmitted from the external communication devices 414 and 424, in addition to the lighting colors and the traveling direction instructions of the traffic signals arranged in the traveling direction. For example, the communication is given such that the lighting color is green, the minimum lighting period is 0 seconds, and the maximum lighting period is 10 seconds, in some cases. In such cases, the acquisition of the traffic signal information through communication has been successful. However, there is a possibility that the traffic signal to be displayed changes to yellow after 0 seconds, and there can be a case where lighting prediction information of the traffic signal becomes uncertain.

Therefore, as in the present embodiment, after the traffic signal information that has been acquired by the communication unit is compared with the information of the display of the traffic signal that has been recognized by the imaging unit, the display of the traffic signal to be displayed is determined. Thus, a display with high accuracy is enabled. Further, at the time of comparison, a reference period may be set in consideration of the minimum lighting period. That is, in a case where a minimum reference period before the display of the traffic signal changes is longer than the period before the moving body is estimated to enter the intersection, the traffic signal information that has been acquired by the communication unit may be prioritized. On the other hand, in a case where the minimum reference period is shorter than the estimated period, the information that has been acquired by the communication unit and the information that has been recognized by the imaging unit may be compared.

Modifications

Figure 3B:
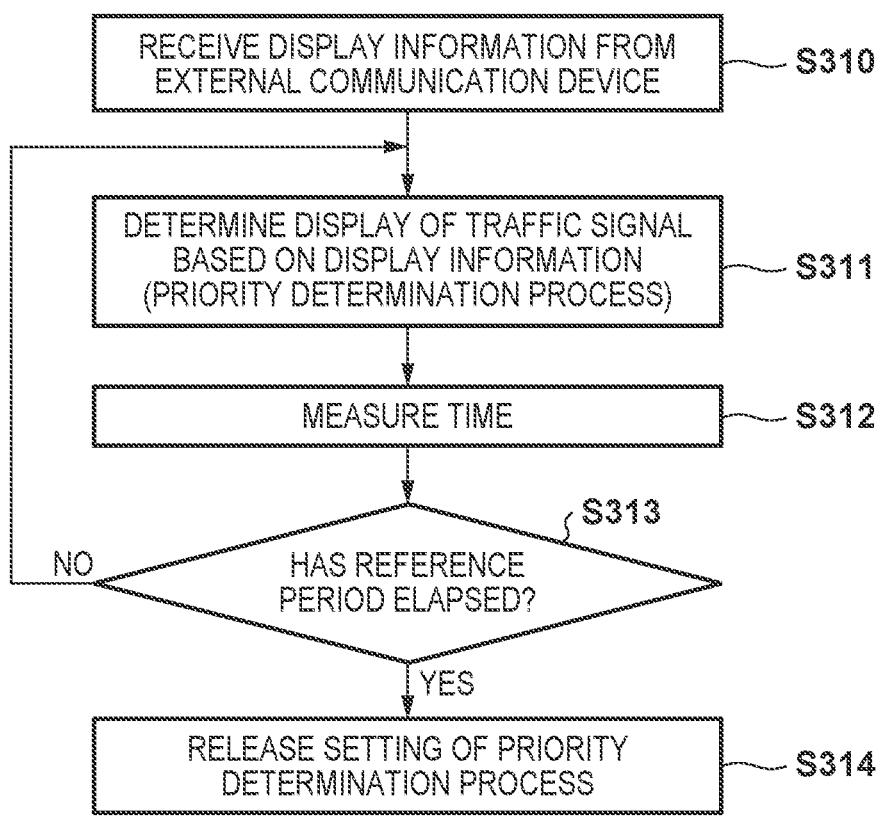
FIG. 3B is a diagram illustrating a flow of a process performed by the control device related to a priority determination process.

In the first embodiment, the basic processes of the lighting color determination unit and the traveling direction determination unit have been described. In the present example, a description will be given with regard to a process of determining (priority determination process), by the ECU 28 (control portion), the display of the traffic signal (the lighting color and the instruction for the traveling direction) by preferentially using the information that has been received from the external communication devices 414 and 424 within the reference period from the time when the display information is received from the external communication devices 414 and 424. Then, after the reference period elapses, the ECU 28 (control portion) releases the setting of the priority determination process, and changes the setting to return to the basic process that has been described in the first embodiment. The priority determination process described in the present example is, for example, the process performed in S305 of FIG. 3A. FIG. 3B is the diagram for describing the flow of the process of the control device 2 related to the priority determination process.

In S310 of FIG. 3B, the communication unit (communication device 24c, 25a) receives the display information of the traffic signal from the external communication devices 414 and 424 through wireless communication.

In S311, the ECU 28 (control portion) determines the display of the traffic signal related to the intersection located to be closest to the traveling location, based on the display information that has been received.

In the present step, within the reference period after the display information is received, the lighting color determination unit determines the lighting color of the traffic signal to be displayed on the display unit, based on the lighting color of the traffic signal that has been acquired from the display information, regardless of the predetermined priority order (FIG. 7) based on the comparison result (the priority determination process of the lighting color). Further, within the reference period after the display information is received, the traveling direction determination unit determines the instruction for the traveling direction to be displayed on the display unit, based on the instruction for the traveling direction of the traffic signal that has been acquired from the display information, regardless of the comparison result (the priority determination process of the instruction for the traveling direction).

In S312, the ECU 28 (control portion) starts measuring the time based on an internal clock in accordance with a reception of the display information.

In S313, the ECU 28 (control portion) determines whether the measured time has elapsed the reference period. In a case where the reference period has not elapsed (S313—No), the process returns to S311, and performs a similar process repeatedly. On the other hand, in a case where the reference period has elapsed in the determination of S313 (S313—Yes), the ECU 28 (control portion) advances the process to S314.

In S314, the ECU 28 (control portion) releases the setting of the priority determination process performed in S311. After the reference period elapses, the lighting color determination unit determines the lighting color of the traffic signal to be displayed on the display unit in accordance with the predetermined priority order (FIG. 7) based on the comparison result, regardless of the priority determination process of the lighting color. In addition, after the reference period elapses, the traveling direction determination unit determines the instruction for the traveling direction that matches as a comparison result, as the instruction for the traveling direction to be displayed on the display unit, regardless of the priority determination process of the instruction for the traveling direction.

Second Embodiment

In the first embodiment, the description has been given with regard to the configuration for determining the display of the traffic signal, based on the display of the traffic signal that has been recognized by the recognition unit (ECU 22, 23) and the display information that has been received by the communication unit (communication device 24c, 25a). In a second embodiment, a description will be given with regard to a configuration for determining the display of the traffic signal by additionally combining map information that holds the display information of the traveling direction of the traffic signal. The configuration of the control device 2 is similar to those of FIGS. 1 and 2 that have been described in the first embodiment.

Figure 3C:
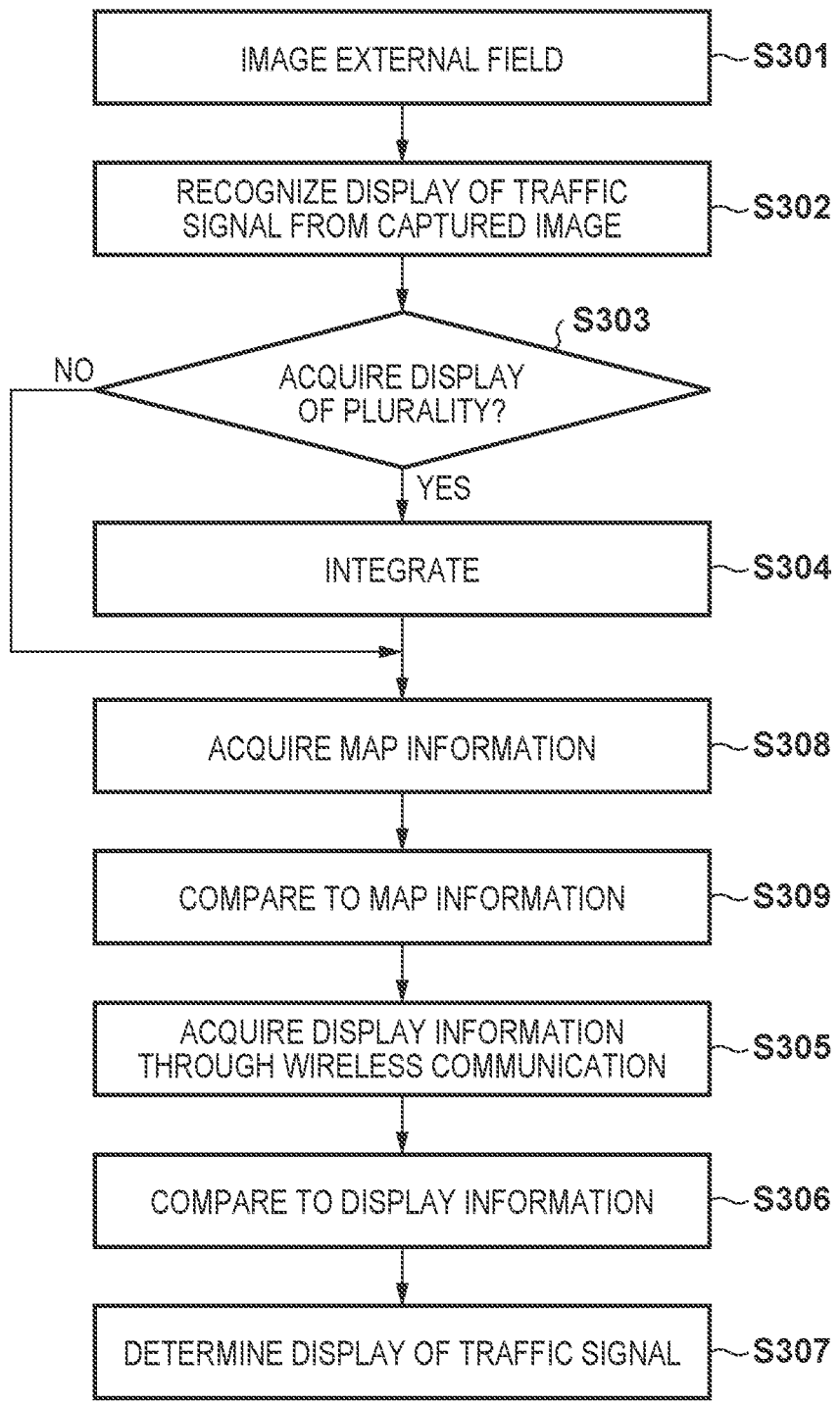
FIG. 3C is a diagram for describing a flow of a process performed by the control device according to a second embodiment.

FIG. 3C is a diagram for describing a flow of a process by the control device according to the second embodiment. In FIG. 3C, the processes of S301 to S305, S306 and S307 are similar to the processes that have been described in the first embodiment, the processes of different steps will be described below, and overlapping descriptions will be omitted.

After the integration process of S304, in S308 of FIG. 3C, the communication unit (communication device 24c, 25a) acquires map information that holds display information of the traffic signal (the lighting color and the traveling direction of the traffic signal) through wireless communication. It is assumed that the map information holds at least display information indicating the direction of the arrow signal, as the display information of the traffic signal. Note that the acquisition of the map information is not limited to the wireless communication, and the control device 2 can store, in a storage device or the like beforehand, the map information that holds at least display information of the traveling direction of the traffic signal indicating the direction of the arrow signal, as the display information of the traffic signal.

In S309, the ECU 28 (control portion) compares the integrated signal display 530 acquired in S304 with the map information (S308).

Figure 9:
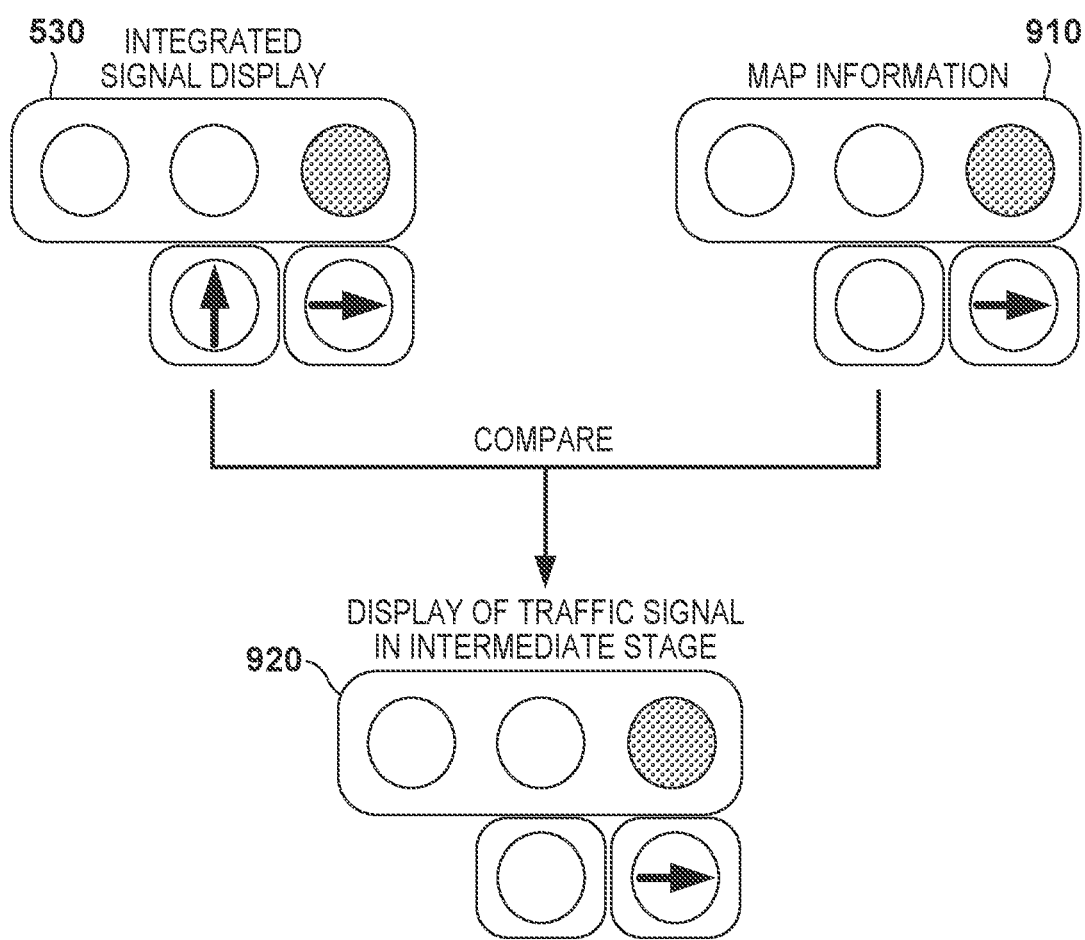
FIG. 9 is a diagram schematically illustrating a comparison process between an integrated signal display and map information.

FIG. 9 is a diagram schematically illustrating a comparison process between the integrated signal display 530 (S304) and map information 910 (S308). In various pieces of information held in the map information, it is assumed that the map information 910 illustrated in FIG. 9 indicates the display information of the traffic signal related to the intersection located to be closest to the traveling location of the moving body. The map information 910 indicates that the display information of the traffic signal includes a lighting display unit indicating the presence or absence of display units of three colors ("red", "yellow", and "green") and an arrow signal unit for turning to the right as the instruction for the traveling direction. It is assumed that the information of the lighting display unit does not include color limitation information regarding the lighting color that is currently lighting.

The ECU 28 (control portion) acquires a display 920 of the traffic signal in an intermediate stage based on the comparison process. The lighting color cannot be limited in the comparison process between the integrated signal display 530 and the map information 910. Hence, the ECU 28 (control portion) sets the display (red) of the lighting color in the integrated signal display 530 to the display 920 of the traffic signal in the intermediate stage.

Further, regarding the arrow signal, the traveling direction determination unit determines (sets), as the instruction for the traveling direction to be displayed on the display unit, the instruction for the traveling direction of the traffic signal that is the same with the display information (turning to the right) held in the map information 910 related to the intersection located to be closest to the traveling location, from among the instructions for the traveling directions of the traffic signals that have been recognized by the recognition unit (ECU 22, 23) (for example, traveling straight, turning to the right).

That is, the traveling direction determination unit excludes the instruction for the traveling direction of the traffic signal (traveling straight) that is not the same with the display information held in the map information 910, and determines (sets) the remaining instruction (turning to the right) for the traveling direction of the traffic signal, as the instruction for the traveling direction to be displayed on the display unit. The determination in the present step is in the intermediate stage, and the traffic signal is finally displayed in accordance with the following processes in S310 and S307.

In S310, the ECU 28 (control portion) compares the display 920 (S309) of the traffic signal in the intermediate stage with the display information (S305).

Then, in S307, the ECU 28 (control portion) determines the display of the traffic signal based on a comparison result in S306. The ECU 28 (control portion) specifies the traveling location of the moving body based on the location information of the moving body that has been acquired by the location information acquisition unit (ECU 24, gyro sensor 5, GPS sensor 24b), and the ECU 28 (control portion) determines the display of the traffic signal related to the intersection located to be closest to the traveling location, based on the comparison between the display 920 (S309) of the traffic signal in the intermediate stage and the display information (S305).

Here, FIG. 10 is a diagram schematically illustrating a comparison process (S310) of comparing the display 920 of the traffic signal in the intermediate stage with display information 1010 and 1020 that have been received through communication, and a determination process (S307) of determining the display of the traffic signal. ST101 in FIG. 10 is a diagram schematically illustrating the comparison process based on the display information 1010 and the determination process for the display of the traffic signal. Here, the display information 1010 indicates a display state in which the lighting color is red and the instruction for the traveling direction is turning to the right.

ST102 in FIG. 10 is a diagram schematically illustrating the comparison process based on the display information 1020 and the determination process of the display of the traffic signal. The display information 1020 indicates a display state in which the lighting color is red and the instruction for the traveling direction is traveling straight.

Regarding the lighting color of the traffic signal, in the example of the determination process of FIG. 10 (ST101 and ST102), the display 920 of the traffic signal in the intermediate stage and the lighting color (red) of the display information 1010 are the same with each other, and the lighting color determination unit determines the lighting color (red) that is the same with each other, as the lighting color of the traffic signal to be displayed on the display unit in accordance with a predetermined priority order (750 of FIG. 7) based on the comparison result.

Regarding the arrow signal, in the example of the determination process (ST101) of FIG. 10, the traveling direction determination unit compares the arrow signal (turning to the right) of the display 920 of the traffic signal in the intermediate stage with the display information 1010 (turning to the right) that has been received by the communication unit (communication device 24c, 25a), and determines the instruction for the traveling direction (turning to the right) that matches as a comparison result, as the instruction for the traveling direction to be displayed on the display unit.

In addition, in the example of the determination process (ST102) of FIG. 10, it is assumed that the arrow signal (turning to the right) of the display 920 of the traffic signal in the intermediate stage is compared with the display information 1020 (traveling straight) that has been received by the communication unit (communication device 24c, 25a), the directions indicated by the arrow signals are not the same with each other, and the traveling direction determination unit determines that there is no instruction for the traveling direction.

(Modifications)

In a case where the communication unit (communication device 24c, 25a) is not capable of acquiring the display information or the map information through wireless communication, the recognition unit (ECU 22, 23) does not integrate the displays of the plurality of traffic signals even in a case where the recognition unit acquires the displays of the plurality of traffic signals included in the image that has been captured by the camera 41, and determines a display of the traffic signal having higher recognition accuracy in the display of the traffic signal, out of the displays of the plurality of traffic signals that have been recognized in the image processing on the image. The recognition unit is capable of determining the display of the traffic signal having higher recognition accuracy, based on a comparison result in the image processing using resolutions and pixel values of the traffic signal images that have been extracted from the image. In this situation, the lighting color determination unit of the control portion (ECU 28) determines the lighting color of the traffic signal, based on the display of the traffic signal that has been determined by the recognition unit, and the traveling direction determination unit determines the instruction for the traveling direction to be displayed on the display unit based on the display of the traffic signal that has been determined by the recognition unit.

Furthermore, in a case where the recognition unit (ECU 22, 23) is not capable of recognizing the traffic signal, based on the image that has been captured by the camera 41, but is capable of acquiring the display information only through wireless communication, the lighting color determination unit and the traveling direction determination unit may determine the display of the traffic signal, based on the display information that has been acquired through wireless communication, so that the control portion (ECU 28) may display, on the display unit, the display of the traffic signal that has been determined.

Summary of Embodiments and Modifications

The above embodiments disclose at least a control device, a moving body (vehicle) including the control device, a control method, and a program in the following.

Configuration 1. The control device in the above embodiments is a control device (2) to be mounted on a moving body (1), and configured to display, on a display unit (92), a display of a traffic signal included in an image that has been captured by an imaging unit (41) for imaging an external field of the moving body, the control device including:

a recognition unit (22, 23) configured to recognize the display of the traffic signal from the image;

a communication unit (24c, 25a) configured to receive display information of the traffic signal through wireless communication; and a control portion (28) configured to determine the display of the traffic signal, based on the display of the traffic signal that has been recognized by the recognition unit and the display information that has been received by the communication unit, and configured to display, on the display unit, the display of the traffic signal that has been determined, wherein the control portion (28) includes:

a lighting color determination unit configured to compare a lighting color of the traffic signal that has been recognized by the recognition unit with a lighting color of the traffic signal that has been acquired from the display information through the wireless communication, and configured to determine a lighting color of the traffic signal to be displayed on the display unit in accordance with a predetermined priority order based on a comparison result; and a traveling direction determination unit configured to compare an instruction for a traveling direction of the traffic signal that has been recognized by the recognition unit with an instruction for the traveling direction of the traffic signal that has been acquired from the display information through the wireless communication, and configured to determine an instruction for the traveling direction that matches as a comparison result, as the instruction for the traveling direction to be displayed on the display unit.

According to the control device in the configuration 1, the display of the traffic signal can be determined, based on the comparison between the recognition result of the imaging unit and the display information that has been received by the communication unit through communication.

Configuration 2. In the control device in the above embodiments, a location information acquisition unit configured to acquire location information of the moving body is further included, in which
  the control portion (28) specifies a traveling location of the moving body, based on the location information of the moving body that has been acquired by the location information acquisition unit,
  the control device includes, as the display information of the traffic signal, map information that holds at least display information of a traveling direction of a traffic signal indicating a direction of an arrow signal, and
  the traveling direction determination unit further determines, as the instruction for the traveling direction to be displayed on the display unit, the instruction for the traveling direction of the traffic signal that matches the display information held in the map information, with respect to an intersection located to be closest to the traveling location, out of the instructions for the traveling directions of the traffic signals that have been recognized by the recognition unit.

Configuration 3. In the control device in the above embodiments, the traveling direction determination unit
  excludes, from the instructions for the traveling directions of the traffic signals that have been recognized by the recognition unit, an instruction for a traveling direction that does not match the instruction for the traveling direction of the traffic signal that has been acquired from the display information through the wireless communication,
  further excludes an instruction for a traveling direction of the traffic signal that does not match the display information held in the map information, and
  determines a remaining instruction for the traveling direction of the traffic signal, as the instruction for the traveling direction to be displayed on the display unit.

Configuration 4. In the control device in the above embodiments, the traveling direction determination unit determines, as the instruction for the traveling direction to be displayed on the display unit, an instruction for the traveling direction of the traffic signal that matches the instruction for the traveling direction of the traffic signal that has been acquired from the display information through the wireless communication and that matches the display information held in the map information, out of the instructions for the traveling directions of the traffic signals that have been recognized by the recognition unit.

According to the control device in the configurations 2 to 4, the display of the traffic signal can be determined, based on the recognition result of the imaging unit and the comparison between the display information and the map information that have been received by the communication unit through communication.

Configuration 5. In the control device in the above embodiments, the recognition unit (22, 23) recognizes, as the display of the traffic signal, an integrated signal display in which displays of the plurality of traffic signals are integrated, in a case of acquiring the displays of the plurality of traffic signals included in the image, and
  the traveling direction determination unit determines an instruction for the traveling direction that matches as a comparison result between the integrated signal display and the display information that has been acquired through the wireless communication, as the instruction for the traveling direction to be displayed on the display unit.

According to the control device in the configuration 5, when the displays of the plurality of traffic signals included in the captured image are acquired, the display (integrated signal display) obtained by integrating the displays of the plurality of traffic signals can be acquired as a comparison target, and the display of the traffic signal can be determined, based on the comparison result of the comparison process using the integrated signal display.

Configuration 6. In the control device in the above embodiments, the communication unit (24*c*, 25*a*) receives the display information of the traffic signal through the wireless communication with an external communication device (414, 424) arranged above a lane in which the moving body travels, with respect to the traffic signal arranged at the intersection located to be closest to the traveling location, and
  the external communication device communicates with a signal control system that controls the display of the traffic signal, and distributes the display information of the traffic signal that has been received from the signal control system.

According to the control device in the configuration 6, the communication unit of the moving body is capable of receiving the display information of the traffic signal through communication with the external communication device, and by using the received display information, the display of the traffic signal can be determined, based on the comparison between the recognition result of the imaging unit and the display information that has been received by the communication unit through communication.

Configuration 7. In the control device in the above embodiments, in a case where the communication unit (24*c*, 25*a*) receives the display information of the traffic signal from the external communication device (414, 424),
  the lighting color determination unit determines the lighting color of the traffic signal to be displayed on the display unit, based on the lighting color of the traffic signal that has been acquired from the display information, regardless of a predetermined priority order based on the comparison result, within a reference period of time after the display information is received, and
  the traveling direction determination unit determines the instruction for the traveling direction to be displayed on the display unit, based on the instruction for the traveling direction of the traffic signal that has been acquired from the display information, regardless of the comparison result, within the reference period of time after the display information is received.

Configuration 8. In the control device in the above embodiments, after the reference period of time elapses, the lighting color determination unit determines the lighting color of the traffic signal to be displayed on the display unit in accordance with the predetermined priority order based on the comparison result, and
  after the reference period of time elapses, the traveling direction determination unit determines the instruction for the traveling direction that matches as the comparison result, as the instruction for the traveling direction to be displayed on the display unit.

According to the control device in the configurations 7 and 8, even when the signal control system changes the control timing of the display of the traffic signal in accordance with the congestion situation of the intersection, the signal control system is capable of reducing the influence of the change in the control timing and determining the display of the traffic signal with high accuracy, by switching the comparison process before and after the reference period of time while accurate information of the display information can be maintained elapses.

Configuration 9. In the control device in the above embodiments, in a case where the communication unit (24c, 25a) fails in acquiring the display information and the map information through the wireless communication, the recognition unit (22, 23) avoids integration of displays of the plurality of traffic signals, even in a case of acquiring the displays of the plurality of traffic signals included in the image, and determines a display of a traffic signal having higher recognition accuracy, out of displays of the plurality of traffic signals that have been recognized by image processing on the image, the lighting color determination unit determines the lighting color of the traffic signal based on the display of the traffic signal that has been determined by the recognition unit, and the traveling direction determination unit determines the instruction for the traveling direction to be displayed on the display unit, based on the display of the traffic signal that has been determined by the recognition unit.

According to the control device in the configuration 9, in the case where the display information and the map information to be used in the comparison process cannot be acquired, the display of the traffic signal can be determined, based on the display of the traffic signal with higher recognition accuracy that has been determined by the recognition unit.

Configuration 10. The moving body in the above embodiments includes the control device (2) described in one of the configurations 1 to 9.

According to the moving body in the configuration 10, it is possible to provide a moving body including the control device described in one of the configurations 1 to 9.

Configuration 11. The control method in the above embodiments is a control method, by a control device (2) to be mounted on a moving body (1), and configured to display, on a display unit, a display of a traffic signal included in an image that has been captured by an imaging unit (41) for imaging an external field of the moving body, the control method including:

recognizing (S302), by a recognition unit (22, 23), the display of the traffic signal from the image;

receiving (S305), by a communication unit (24c, 25a), display information of the traffic signal through wireless communication; and determining (S306, S307), by a control portion, the display of the traffic signal, based on the display of the traffic signal that has been recognized by the recognizing and the display information that has been received by the receiving, and displaying, on the display unit, the display of the traffic signal that has been determined, wherein the displaying includes:

comparing a lighting color of the traffic signal that has been recognized by the recognizing with a lighting color of the traffic signal that has been acquired from the display information through the wireless communication, and determining the lighting color of the traffic signal to be displayed on the display unit in accordance with a predetermined priority order based on a comparison result; and comparing an instruction for a traveling direction of a traffic signal that has been recognized by the recognizing with an instruction for the traveling direction of the traffic signal that has been acquired from the display information through the wireless communication, and determining the instruction for the traveling direction that matches as a comparison result, as the instruction for the traveling direction to be displayed on the display unit.

According to the control method in the configuration 11, the display of the traffic signal can be determined, based on the comparison between the recognition result of the imaging unit and the display information that has been received by the communication unit through communication.

Configuration 12. In a program in the above embodiments, a computer is caused to execute each step of the control method described in the configuration 11.

According to this configuration, it is possible to provide a program for causing a computer to execute each step of the above-described control method.

Other Embodiments

According to the present invention, it is also possible to supply a program for realizing the functions of the above-described embodiments to a system or a control device that controls a moving body via a network or a storage medium, so that one or more processors in a computer of the system or the control device can read the program and execute process of the control device.

The invention is not limited to the foregoing embodiments, and various variations/changes are possible within the spirit of the invention.

What is claimed is:

1. A control device to be mounted on a moving body, and configured to display, on a display unit, a display of a traffic signal included in an image that has been captured by an imaging unit for imaging an external field of the moving body, the control device comprising:

a recognition unit configured to recognize the display of the traffic signal from the image;

a communication unit configured to receive display information of the traffic signal through wireless communication; and a control portion configured to determine the display of the traffic signal, based on the display of the traffic signal that has been recognized by the recognition unit and the display information that has been received by the communication unit, and configured to display, on the display unit, the display of the traffic signal that has been determined, wherein the control portion comprises:

a lighting color determination unit configured to compare a lighting color of the traffic signal that has been recognized by the recognition unit with a lighting color of the traffic signal that has been acquired from the display information through the wireless communication, and configured to determine a lighting color of the traffic signal to be displayed on the display unit in accordance with a predetermined priority order based on a comparison result; and a traveling direction determination unit configured to compare an instruction for a traveling direction of the traffic signal that has been recognized by the recognition unit with an instruction for a traveling direction of the traffic signal that has been acquired from the display information through the wireless communication, and configured to determine the instruction for the traveling direction that matches as a comparison result, as the instruction for the traveling direction to be displayed on the display units, the control device includes, as the display information of the traffic signal, map information that holds at least display information of a traveling direction of a traffic signal indicating a direction of an arrow signal, the traveling direction determination unit excludes, from the instructions for the traveling directions of the traffic signals that have been recognized by the recognition unit, an instruction for a traveling direction that does not match the instruction for the traveling direction of the traffic signal that has been acquired from the display information through the wireless communication, further excludes an instruction for a traveling direction of the traffic signal that does not match the display information held in the map information, and determines a remaining instruction for the traveling direction of the traffic signal, as the instruction for the traveling direction to be displayed on the display unit.

2. The control device according to claim 1, further comprising a location information acquisition unit configured to acquire location information of the moving body, wherein the control portion specifies a traveling location of the moving body, based on the location information of the moving body that has been acquired by the location information acquisition unit, and the traveling direction determination unit further determines, as the instruction for the traveling direction to be displayed on the display unit, the instruction for the traveling direction of the traffic signal that matches the display information held in the map information, with respect to an intersection located to be closest to the traveling location, out of the instructions for the traveling directions of the traffic signals that have been recognized by the recognition unit.

3. The control device according to claim 2, wherein the traveling direction determination unit determines, as the instruction for the traveling direction to be displayed on the display unit, an instruction for the traveling direction of the traffic signal that matches the instruction for the traveling direction of the traffic signal that has been acquired from the display information through the wireless communication and that matches the display information held in the map information, out of the instructions for the traveling directions of the traffic signals that have been recognized by the recognition unit.

4. The control device according to claim 1, wherein the recognition unit recognizes, as the display of the traffic signal, an integrated signal display in which displays of the plurality of traffic signals are integrated, in a case of acquiring the displays of the plurality of traffic signals included in the image, and the traveling direction determination unit determines the instruction for the traveling direction that matches as a comparison result between the integrated signal display and the display information that has been acquired through the wireless communication, as the instruction for the traveling direction to be displayed on the display unit.

5. The control device according to claim 2, wherein the communication unit receives the display information of the traffic signal through the wireless communication with an external communication device arranged above a lane in which the moving body travels, with respect to the traffic signal arranged at the intersection located to be closest to the traveling location, and the external communication device communicates with a signal control system that controls the display of the traffic signal, and distributes the display information of the traffic signal that has been received from the signal control system.

6. The control device according to claim 5, wherein in a case where the communication unit receives the display information of the traffic signal from the external communication device, the lighting color determination unit determines the lighting color of the traffic signal to be displayed on the display unit, based on the lighting color of the traffic signal that has been acquired from the display information, regardless of a predetermined priority order based on the comparison result within a reference period of time after the display information is received, and the traveling direction determination unit determines the instruction for the traveling direction to be displayed on the display unit, based on the instruction for the traveling direction of the traffic signal that has been acquired from the display information, regardless of the comparison result, within the reference period of time after the display information is received.

7. The control device according to claim 6, wherein after the reference period of time elapses, the lighting color determination unit determines the lighting color of the traffic signal to be displayed on the display unit in accordance with the predetermined priority order based on the comparison result, and after the reference period of time elapses, the traveling direction determination unit determines the instruction for the traveling direction that matches as the comparison result, as the instruction for the traveling direction to be displayed on the display unit.

8. The control device according to claim 2, wherein in a case where the communication unit fails in acquiring the display information and the map information through the wireless communication, the recognition unit avoids integration of displays of the plurality of traffic signals, even in a case of acquiring the displays of the plurality of traffic signals included in the image, and determines a display of a traffic signal having higher recognition accuracy, out of displays of the plurality of traffic signals that have been recognized by image processing on the image, the lighting color determination unit determines the lighting color of the traffic signal based on the display of the traffic signal that has been determined by the recognition unit, and the traveling direction determination unit determines the instruction for the traveling direction to be displayed on the display unit, based on the display of the traffic signal that has been determined by the recognition unit.

9. A moving body comprising the control device of claim 1.

10. A control method, by a control device to be mounted on a moving body, and configured to display, on a display unit, a display of a traffic signal included in an image that has been captured by an imaging unit for imaging an external field of the moving body, the control method comprising:

recognizing, by a recognition unit, the display of the traffic signal from the image;

receiving, by a communication unit, display information of the traffic signal through wireless communication; and determining, by a control portion, the display of the traffic signal, based on the display of the traffic signal that has been recognized by the recognizing and the display information that has been received by the receiving, and displaying, on the display unit, the display of the traffic signal that has been determined, wherein the displaying comprises:

comparing a lighting color of the traffic signal that has been recognized by the recognizing with a lighting color of the traffic signal that has been acquired from the display information through the wireless communication, and determining the lighting color of the traffic signal to be displayed on the display unit in accordance with a predetermined priority order based on a comparison result; and comparing an instruction for a traveling direction of a traffic signal that has been recognized by the recognizing with an instruction for the traveling direction of the traffic signal that has been acquired from the display information through the wireless communication, and determining the instruction for the traveling direction that matches as a comparison result, as the instruction for the traveling direction to be displayed on the display unit;

including map information that holds at least display information of a traveling direction of a traffic signal indicating a direction of an arrow signal as the display information of the traffic signal, excluding, from a plurality of possible instructions for the traveling directions of the traffic signals that have been recognized by the recognition unit, one of the instructions for a traveling direction that does not match the instruction for the traveling direction of the traffic signal that has been acquired from the display information through the wireless communication, excluding a respective instruction for a traveling direction of the traffic signal that does not match the display information held in the map information, and determining a remaining instruction for the traveling direction of the traffic signal, as the instruction for the traveling direction to be displayed on the display unit.

11. A storage medium storing a program for causing a computer to execute each step of the control method of claim 10.

* * * * *